United States Patent
Nimmagadda

[11] Patent Number: 5,854,836
[45] Date of Patent: *Dec. 29, 1998

[54] METHOD AND SYSTEM FOR UTILIZING AN INFORMATION DELIVERY SERVICE IN A LOCAL NUMBER PORTABILITY ENVIRONMENT

[75] Inventor: Prasad V. Nimmagadda, Norcross, Ga.

[73] Assignee: BellSouth Corporation, Atlanta, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 738,009

[22] Filed: Oct. 25, 1996

[51] Int. Cl.$^6$ .............................. H04M 1/64; H04M 3/42; H04M 7/00; H04M 3/00
[52] U.S. Cl. ...................... 379/207; 379/88.01; 379/211; 379/221; 379/243
[58] Field of Search ................................. 379/67, 88, 89, 379/207, 211, 212, 213, 220, 221, 243

[56] References Cited

U.S. PATENT DOCUMENTS

| | | | |
|---|---|---|---|
| 4,754,479 | 6/1988 | Bicknell et al. | 379/207 |
| 5,557,658 | 9/1996 | Gregorek et al. | 379/67 |
| 5,598,464 | 1/1997 | Hess et al. | 379/213 |
| 5,602,909 | 2/1997 | Carkner et al. | 379/207 |
| 5,610,977 | 3/1997 | Williams et al. | 379/207 |

FOREIGN PATENT DOCUMENTS

0708570A2  4/1996  European Pat. Off. .

WO 96/31973  10/1996  WIPO .

*Primary Examiner*—Fan S. Tsang
*Assistant Examiner*—Allan Hoosain
*Attorney, Agent, or Firm*—Jones & Askew, LLP

[57] ABSTRACT

A method and system for delivering information obtained from an information delivery service database with a location routing number obtained from a local number portability database. A communication is received from an originating user number and directed to an end user number, and a determination may be made as to whether the end user number is a portable number. If the end user number is portable, then the end user number is compared to a plurality of ported numbers in the local number portability database for a match to one of the plurality of ported numbers. If the end user number matches one of the plurality of ported numbers in the local number portability database, then a location routing number is obtained corresponding to one of the ported numbers. In addition, information corresponding to the originating user number is obtained from the information delivery service database. Next, a signaling message is populated with the information. Finally, the signaling message with respect to the routing of the communication based on the location routing number is transmitted. The signaling message includes the information obtained from the information delivery service database. The information may comprise an originating user number, a name, or a combination of the originating user number and the name. Therefore, the task of obtaining the information corresponding to the originating user number from the information delivery service database may further comprise obtaining the originating user number and name.

19 Claims, 4 Drawing Sheets

METHOD AND SYSTEM FOR UTILIZING AN INFORMATION DELIVERY SERVICE IN A LOCAL NUMBER PORTABILITY ENVIRONMENT

TECHNICAL FIELD

The present invention relates generally to telecommunications systems, and more particularly, relates to a method and system for combining an information delivery service with local number portability in a local number portability environment.

BACKGROUND OF THE INVENTION

The telecommunications industry is becoming more and more competitive. The 1996 Telecommunications law requires that end users be offered a "choice" in service providers. It also requires that a directory number be portable across service providers.

Local number portability provides the vehicle for allowing a customer to maintain its directory number when the customer changes local service providers. Local number portability is an environment in which more than one service provider offers telecommunications service within the same geographic or portability area. In this environment, a customer retains its directory number regardless of the service provider that provides the customer with service. In other words, with local number portability, a customer with a directory number assigned by a service provider retains that directory number even when a different service provider is used to provide telecommunications service.

Local number portability can be implemented by many methods. A widely accepted and well understood method in the industry for implementing local number portability is the Location Routing Number method (LRN). Conceptually, each directory number in the United States includes ten digits (e.g. 404-222-2500). A group of 10,000 directory numbers having the same first six digits is referred to as an "NPA-NXX." For example, there are 10,000 ten-digit directory numbers that start with 404-222 (i.e., 404-222-0001, 404-222-0002, etc.). Each NPA-NXX is assigned to a single switch, but more than one NPA-NXX may be assigned to any particular switch. That is, the 10,000 directory numbers that start with 404-222 are assigned to a particular switch, the 10,000 directory numbers that start with 404-333 are also assigned to a particular switch, and so on. An NPA-NXX is "portable" when a directory number is assigned to a switch other than the original switch. The directory number, containing the portable NPA-NXX, is generally referred to as a ported directory number due to its switch reassignment. To keep up with the identity of the service provider which serves a ported directory number, a database is used. This database is generally known as a local number portability database. It stores a location routing number in association with each ported directory number within a region served by that local number portability database. The location routing number identifies the current switch/service provider that serves the end user equipment associated with a ported directory number. In essence, the location routing number method allows a directory number to be tracked as a customer changes from one service provider to another service provider, thereby allowing a communication to the customer to be properly routed without the need for assigning a new directory number each time the customer changes service providers.

More particularly described, the LRN method works generally as follows. Take, for example, an originating user who picks up the receiver of a telephone and dials the directory number of a customer. The switch that serves the originating user's line receives the information corresponding to the dialed directory number. The switch checks whether this directory number is a portable directory number by first checking whether the NPA-NXX of the directory number is a portable NPA-NXX. If not, then the directory number is not a ported directory number. The switch applies conventional telecommunications service to the communication. On the other hand, if the NPA-NXX of the directory number is a portable NPA-NXX, then the switch takes steps to obtain a location routing number for transmission of the communication. In particular, the switch initiates a query to the local number portability database. The local number portability database looks up the directory number to determine whether the directory number is a ported directory number. If the directory number is not a ported directory number, then the switch applies conventional telecommunications service to the communication. If the directory number has a match to a ported directory number then the local number portability database finds the location routing number that corresponds to the ported directory number. The local number portability database then provides the location routing number in a response to the switch. This location routing number information is used by the switch to route the communication appropriately.

In sum, the use of the LRN method allows a service provider to route calls to ported directory numbers. Generally, the LRN method does not add significantly to the length of time in processing a communication from an originating user to an end user. Nonetheless, the LRN method adds steps to communication processing. As explained above, these added steps include a pause or suspension in the processing of the communication at the switch that receives the communication. During this pause, the switch may have to carry out two determinations with respect to the communication. First, the switch has to check whether the directory number is a portable directory number. If so, then the switch has to obtain a location routing number corresponding to the ported directory number. Only after these two steps are carried out, the switch then releases the suspension with respect to the processing of the communication and uses the location routing number to further route the communication.

As noted, the local number portability environment provides a customer greater options in subscribing to telecommunications service. Service providers typically like to maintain information relating to their customers within their network. However, a customer may change its selection of service features when the customer changes service providers. Reasons for such changes are myriad, and they may include a better or different selection of service features offered by the new service provider. Examples of these service features provided by a service provider include calling name identification, call forwarding, call waiting, and conference calling. Service features are provided by a service provider through the use of customer information that is stored in an information delivery service database. Typically, an information delivery service database is associated with a telecommunications network element known as a service control point (SCP). The customer information in the SCP is generally accessed after a communication is received for a customer at the switch that serves the customer's line(s) associated with the customer's terminating equipment. This switch is generally referred to as the end office switch.

More particularly described, as a result of having subscribed to a service feature, a trigger will have been set in association with the customer's directory number in the switch that serves the customer's line. When a call comes in for the customer, the switch notes the trigger and launches a query to the service control point. The service control point checks its information delivery service database to determine whether the customer is to be accorded one of the information delivery service features. If so, the service control point checks the directory number and executes a database dip to find information that is stored in the database in association with the customer's service feature or that may be necessary to carry out the service feature. If information is stored in association with the information delivery service feature, then the service control point transmits the information to the switch that serves the customer's line and provides the switch with instructions regarding the information. The switch then applies the service feature to the call using the information and instructions provided by the service control point.

In sum, the availability of service features provides a customer with convenient and versatile telecommunications service. Yet, the application of a service feature generally requires that the processing of the communication to the customer be delayed. In general, this delay may not be substantial with respect to the overall time in the processing of the communication from the originating user to the end user. Nonetheless, the application of a service feature adds steps to communication processing. As explained above, these added steps include a pause or suspension in the processing of the communication at the end office switch. During this pause, the end office switch may have to obtain additional information and/or instructions from another network element such as an information delivery service database in a service control point. Only after these added steps are carried out, the end office switch then releases the suspension with respect to the processing of the communication and then uses the information and/or instructions to apply the service feature.

Presently, the processing of a communication from an originating user to a customer who subscribes to a service feature in a local number portability environment is carried out pursuant to the following general pattern. A communication for a particular directory number is received at the switch which serves the originating user's line associated with the terminating equipment of the originating user. This switch checks whether the directory number is a portable directory number. If so, the switch launches a query to the local number portability database to check to see if the specific directory number is ported. The local number portability database will return a location routing number if the directory number is ported. Otherwise, the local number portability database will return the directory number itself. The switch uses the response from the local number portability database to route the communication to the end office switch that serves the line associated with the customer's terminating equipment. The end office switch pauses before completing the call to the customer if a service feature is set up for this customer. During this pause, the end office switch checks with an information delivery service database for information pertaining to the service feature to which the customer subscribes. Upon receipt of this information, the end office switch then completes the communication to the customer and applies the service feature to the communication as appropriate.

The astute reader will already have noted that in the present operating environment a customer with a ported directory number and a service feature may suffer from disadvantages in the delivery of telecommunications services. These disadvantages may include operating deficiencies in the delivery of the services. These disadvantages also may be a lack of economic efficiency. One of the operating deficiencies in the delivery of services to the customer is that a communication directed to the customer is paused or suspended at least at two points during the communication's processing. A first pause occurs at the switch serving the originating user. A second pause occurs at the switch serving the customer or end user. Even though neither pause may be substantial by itself, in combination, the two pauses may unacceptably delay the processing of a communication. Another operating deficiency is that two separate databases have to be consulted at two different times during communication processing. Presently, as explained, two separate checks have to made with respect to a communication even though both checks are carried out with respect to the directory number to which the communication is directed. During the first consultation to the local number portability database, errors or mistakes may be made to further cause delay in processing of the communication. These errors or mistakes may be compounded by errors or mistakes that may be made during the second consultation to the information delivery service database. These errors and mistakes, and especially compounded errors and mistakes, may delay or completely interrupt communication processing. These disadvantages are suffered by other customers in similar circumstances.

The astute reader will also already have noted that in the present environment a service provider that provides service features in a local number portability environment may suffer from disadvantages in the provision of telecommunications services to customers. These disadvantages may include system operating deficiencies, as well as economic deficiencies. One of these system operating deficiencies is that a service provider has to maintain or have access to two separate databases at two different points in the processing of a communication. Extra provisions have to be made with respect to setting up the appropriate triggers at switches, and to adding data communication lines, equipment and controls as necessary. Another deficiency is that the service provider is unable to process communications as quickly as may be desired, thereby placing the service provider at a disadvantage with respect to other service providers. To overcome these operating deficiencies, a service provider may incur a great deal of expense. This extra expense may be passed on to customers, or it may reduce the profits of the service provider. Neither alternative is acceptable.

Therefore, there is a need for an improved system that allows a service provider to provide a service feature to a customer in a local number portability environment.

There is also a need for a system that allows each service provider to internally maintain information about their customers and to share such information as needed on a per call basis.

There is an additional need for a system that operates efficiently in the provision of telecommunications services to customers.

There is another need for a system that allows a service provider to process communications as quickly as possible.

There is yet another need for a system that does not require pauses at two separate points during communication processing, thereby reducing the amount of errors or mistakes that may be compounded as a result of separate pauses for each database consultation.

There is a further need for a system that does not require extra provisions for setting up appropriate triggers at switches and for adding data communication lines, equipment and controls, thereby eliminating an extra expense passed on to customers and a reduction in the profits of a service provider.

SUMMARY OF THE INVENTION

The present invention satisfies the above-described needs by providing a method and system for delivering information obtained from an information delivery service database with a location routing number obtained from a local number portability database. The present invention utilizes an information delivery service in a local number portability environment. Specifically, the present invention eliminates the need for separate database consultations for retrieving information from an information delivery service database by performing an information look-up during a routine local number portability database consultation. The information obtained from the information delivery service database can then be transmitted along with the location routing number obtained from a local number portability database in a local number portability response. Finally, the information can then be transmitted between switches to a switch serving the end user by utilizing parameters in a signaling message.

There are several advantages to utilizing the present invention. The present invention allows a service provider to provide a service feature to a customer in a local number portability environment. The present invention enables a service provider to keep information within its network and only supply the information on a per call basis. The present invention also operates efficiently in the provision of telecommunications services to customers. In addition, the present invention allows a service provider to process communications quickly and accurately. Furthermore, the present invention does not require pauses at two separate points during communication processing, thereby reducing the amount of errors or mistakes that may be compounded as a result of separate pauses for each database consultation. Finally, the present invention does not require extra provisions for setting up appropriate triggers at switches and for adding data communication lines, equipment and controls, thereby eliminating an extra expense passed on to customers and a reduction in the profits of a service provider.

Generally described, the present invention is a method and system for delivering information in a local number portability environment. In an embodiment of the present invention, a communication is received from an originating user number and directed to an end user number that has a portable NPA-NXX. Next, a trigger is provisioned with respect to said NPA-NXX. In response to the trigger, a location routing number corresponding to the ported number is obtained from the local number portability database. In addition, information corresponding to an originating user is obtained from the information delivery service database. Next, a signaling message is populated with the information. Finally, the signaling message with respect to the routing of the communication is transmitted based on the location routing number. The signaling message includes the information obtained from the information delivery service database.

With respect to the embodiment described in the immediately preceding paragraph, the information may comprise an originating user number, a name, or a combination of the originating user and the name. Therefore, the task of obtaining the information corresponding to the originating user number from the information delivery service database may further comprise obtaining the originating user number and name.

In another embodiment of the present invention, after receiving a communication from an originating user number and directing the communication to an end user number, a determination is made as to whether the end user number is portable. If the end user number is portable, then the end user number is compared to a plurality of ported numbers in a local number portability database for a match to one of the plurality of ported numbers. If the end user number matches one of the plurality of ported numbers in the local number portability database, then a location routing number is obtained corresponding to one of the ported numbers. Next, information corresponding to the originating user number is obtained from the information delivery service database. This information is then populated in a signaling message used in connection with the routing of the communication. Finally, the signaling message is transmitted based on the location routing number.

With respect to the embodiment described in the immediately preceding paragraph, the information may comprise an originating user number, a name, or a combination of the originating user and the name. Therefore, the task of obtaining the information corresponding to the originating user number from the information delivery service database may further comprise obtaining the originating user number and name.

The present invention also provides a system for delivering information obtained from an information delivery service database in a local number portability environment. In this system, a first network element is operative to receive a communication from an originating user number and directed to an end user number and is operative to determine whether the end user number is portable. A local number portability database is functionally connected to the first network element. The local number portability database is operative to compare the end user number to a plurality of ported numbers for a match to one of the ported numbers. The local number portability database is also operative to obtain a location routing number corresponding to one of the ported numbers. Also in this system, an information delivery service database is functionally connected to the local number portability database. The local number portability database is further operative to obtain information corresponding to the originating user number from the information delivery service database. Also, the local number portability database is further operative to provide the location routing number and the information to the first network element. The first network element is further operative to populate the information in a signaling message relating to the routing of the communication, and to transmit the signaling message based on the location routing number to a second network element.

With respect to the embodiment described in the immediately preceding paragraph, the information may comprise the originating user number, a name, or a combination of the originating user number and the name.

Thus, the present invention provides a method and system for delivering information obtained from an information delivery service database with a location routing number obtained from a local number portability database.

It is an object of the present invention to provide an improved system that allows a service provider to provide a service feature to a customer in a local number portability environment.

It is another object of the present invention to provide a system that operates efficiently in the provision of telecommunications services to customers.

It is yet another object of the present invention to provide a system that allows a service provider to process communications as quickly and as accurately as possible.

It is a further object of the present invention to provide a system that does not require pauses at two separate points during communication processing, thereby reducing the amount of errors or mistakes that may be compounded as a result of separate pauses for each database consultation.

It is yet another object of the present invention to provide a system that does not require extra provisions for setting up appropriate triggers at switches and for adding data communication lines, equipment and controls, thereby eliminating an extra expense that otherwise may be passed on to customers and a reduction in the profits of a service provider.

These and other objects, features, and advantages of the present invention may be more clearly understood and appreciated from a review of the following detailed description of the disclosed embodiments and by reference to the appended drawings and claims.

DETAILED DESCRIPTION OF THE PREFERRED EMBODIMENT

The present invention is directed to a method and system for delivering information obtained from an information delivery service database with a location routing number obtained from a local number portability database. The discussion that follows describes the preferred environment of the present invention and then describes the preferred method and system of the present invention for delivery of information in a local number portability environment.

Preferred Environment of a Switched Telephone Network

Figure 1:
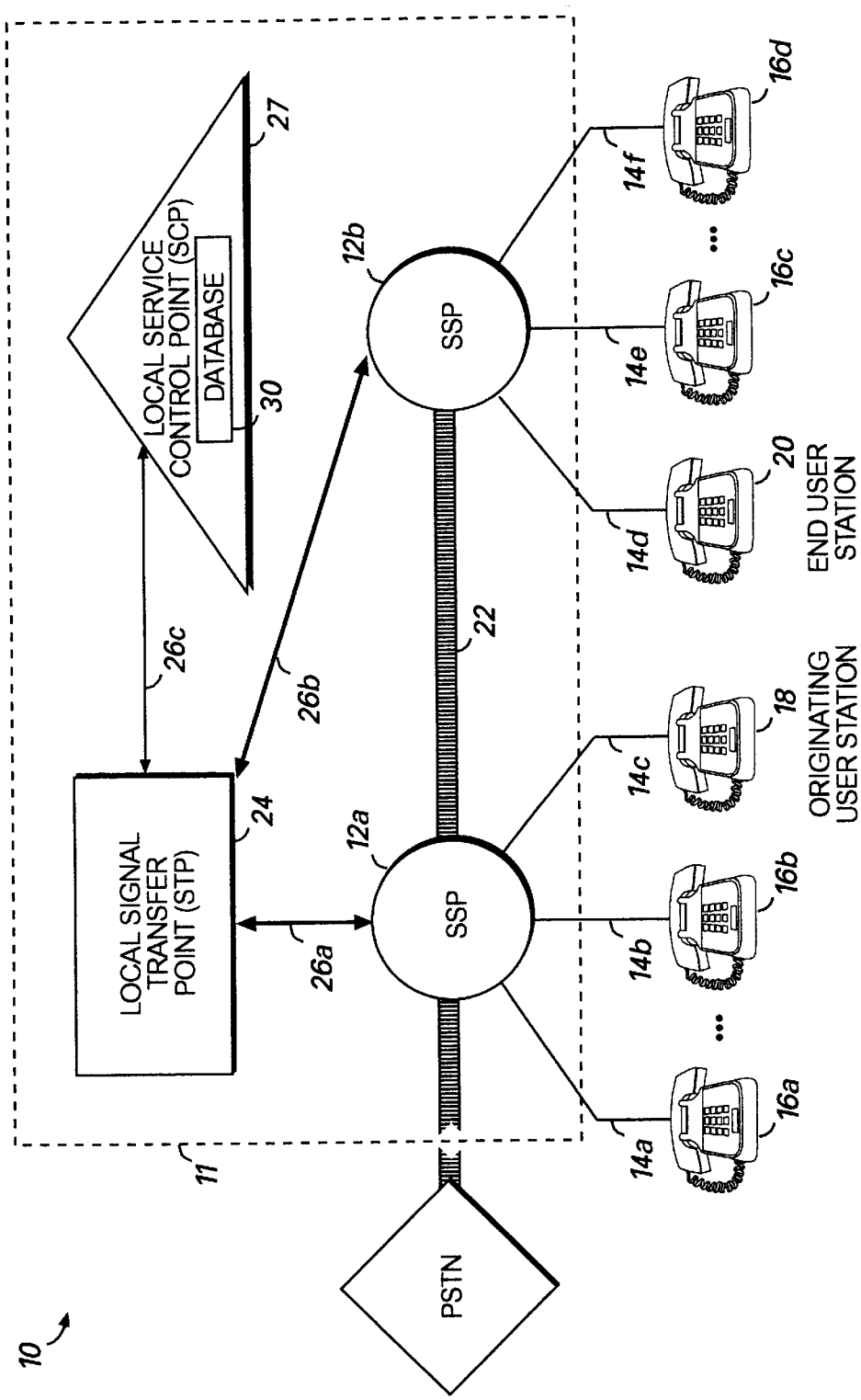
FIG. 1 is a diagram illustrating a switched telephone network including the Advanced Intelligent Network.

Referring now to the drawings, in which like numerals indicate like elements throughout the several figures, FIG. 1 is a block diagram illustrating the public switched telephone network (PSTN) 10 and an illustrative portion 11 of the PSTN. In particular, the portion 11 of the PSTN illustrates a part of the Advanced Intelligent Network (AIN) of a typical local exchange carrier. The AIN, which is well known to those skilled in the art, is the preferred environment of the preferred embodiment of the present invention. Incorporated herein by reference is the patent to Weisser, U.S. Pat. No. 5,245,719, and assigned to the assignee of the present invention, which generally describes operation of the AIN.

The AIN includes a plurality of central offices. Each central office typically includes an electronic switch known to those skilled in the art as a service switching point (SSP). A plurality of representative SSPs are shown as SSPs 12a and 12b in FIG. 1. An SSP (specifically, a Class 5 central office switch) is the AIN component of a typical electronic central office switch used by a local exchange carrier. The terms "SSP" and "switch" are used interchangeably herein and are understood to refer to a telecommunications switch for connecting voice channel circuits including voice channel lines commonly designated as 14 in FIG. 1. Switches are interconnected through a network of high volume channel lines known as "trunks" represented by trunk 22 in FIG. 1. In the preferred environment, an SSP is equipped with AIN software release 0.1 or higher release. For more information, see Bellcore Specification TR-NWT-001284 Switching Systems Generic Requirements for AIN 0.1, which is incorporated herein by reference.

As illustrated in FIG. 1, SSPs 12a and 12b are connected to a plurality of customer voice channel lines commonly designated as 14. Each customer line is connected to a piece of terminating equipment, typically a telephone, commonly designated as 16. Those skilled in the art will understand that terminating equipment may include other communication devices such as wireless telephones, facsimile machines, computers, modems, stations, etc. One of the illustrated telephones is designated as an originating user station 18 that is operated by an originating user. Another one of the illustrated telephones is designated as an end user station 20 that is operated by an end user. Reference to the originating user station and the end user station will be useful in the description of the preferred embodiment as set forth below in which a communication is connected between the originating user station and the end user station. By way of example, FIG. 1 illustrates the originating user station 18 as connected via customer line 14c to SSP 12a, and the end user station 20 as connected via customer line 14d to SSP 12b. SSPs 12a and 12b allow the customer lines 14c and 14d, respectively, to be selectively connected via a voice channel trunk 22 to complete a voice channel connection between the originating user station 18 and the end user station 20.

A trunk is the voice channel circuit that interconnects the central office switches to connect voice channel communications. It should be understood that central office trunking in a typical urban environment is not limited to a daisy chain arrangement as implied by FIG. 1. In other words, a network of trunk circuits interconnect SSPs 12a and 12b with other SSPs (not shown) servicing other pieces of terminating equipment.

As further illustrated in FIG. 1, each SSP in the AIN is connected to a local signal transfer point (STP) via a data link. This arrangement is represented in FIG. 1 by SSPs 12a and 12b which are connected to STP 24 by respective data links 26a and 26b. Currently, these data links employ a signaling protocol referred to as Signaling System 7 (SS7), which is well known to those skilled in the art. STP 24 is a multi-port high speed packet switch that is programmed to respond to the routing information in the SS7 protocol, and route the information to its destination.

Much of the intelligence of the AIN resides in local service control points (SCPs) represented by SCP 27 that is connected to STP 24 via SS7 data link 26c. An SCP is an intelligent communication processing platform. As is known to those skilled in the art, SCPs are physically implemented by relatively powerful fault tolerant computers. Among the functions performed by SCPs is the maintenance of network databases that are used in providing services. For example, SCP 27 includes databases represented by the illustrated customer information database 30 that identifies particular service customers and the services to be accorded to these customers.

In operation, the intelligent network elements of the AIN, as described above, communicate with each other via digital data messages transmitted over the network of digital data links. An SSP may be configured to interface with these network elements through the use of a trigger. A trigger in the network is an event associated with a particular customer line or call that causes the SSP to generate a data packet message to be sent to a service control point. In order to keep the processing of data and calls as simple and generic as possible at the switches, such as switches 12a and 12b, a relatively small set of triggers are defined at the switches for each call.

For example, in response to declaring an NPA-NXX portable, SSPs 12a and 12b are programmed to implement local number portability for the assigned NPA-NXX by configuring each switch with a group-level trigger for the NPA-NXX, which group-level trigger is referred to as an "LNP trigger."

The message created by a switch in response to a trigger is known as a "query" message. A query message opens a "transaction" and the switch generally holds the communication until it receives a reply from an appropriate network element via the network of digital data links instructing the switch to take a certain action. If the switch receives no instructions within a certain amount of time, the switch "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the switch to route the held communication for connection with an end user station. Query messages, conversation messages, and response messages are standard types of messages defined by the AIN protocol. The details of the AIN protocol are well known to those skilled in the art and will not be further described herein. For more information regarding the AIN protocol, see the previously referenced Bellcore Specification TR-NWT-001284 Switching Systems Generic Requirements for AIN 0.1.

Figure 2:
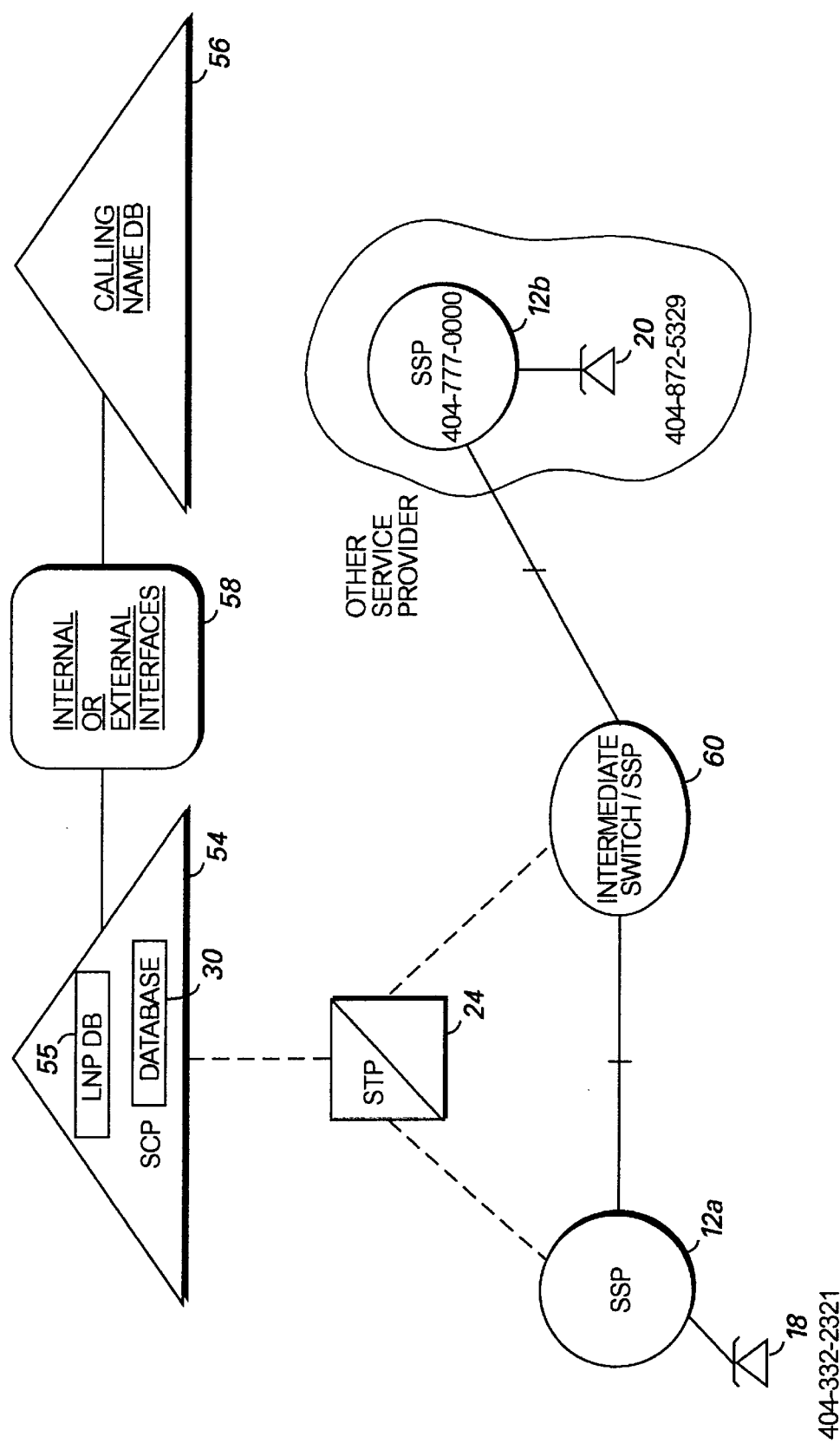
FIG. 2 is a diagram illustrating an overview of the preferred embodiment for utilizing an information delivery service in a local number portability environment in accordance with the preferred embodiment of the present invention.

The Preferred Embodiment for Utilizing an Information Delivery Service in a Local Number Portability Environment With continuing reference to FIG. 1 and now turning to FIG. 2, an overview of the preferred embodiment for utilizing an information delivery service in a local number portability environment is described. FIG. 2 illustrates the preferred embodiment utilizing the calling name feature as the preferred information delivery service. It will be appreciated by those skilled in the art that the present invention is not limited to the calling name feature, but may also include other information which can be delivered corresponding to the directory number of the originating user such as zip code, postal code, social security number, and the like of the subscriber or originating user. An overview of the preferred embodiment is presented by way of example. In this example, a telecommunications service provider provides telecommunications service for an end user. Service is provided to the end user or customer from a switch 12b. Another telecommunications service provider provides telecommunications service for an originating user. Service is provided to the originating user from a switch 12a, which is different from the switch 12b that serves the end user. The originating user places a call from an originating user station 18 having an originating user number (404-332-2321) to the end user at an end user station 20 having an end user number (404-872-5329). For the purposes of this discussion, the terms "originating user number" and "end user number" used herein designate directory numbers of the originating user and end user, respectively. Further, for this example, the switches have been provisioned with a trigger with respect to all portable NPA-NXXs, and in particular, with respect to 404-872.

Once the call is placed by dialing the end user number, a communication is received at the switch 12a. The switch 12a determines whether the end user number is in a portable NPA-NXX. If the end user number is not a portable number, the call is transmitted to the switch 12b and is ultimately transmitted to the end user station 20. In this example, the switch 12a has been provisioned with a trigger for 404-872 as a portable NPA-NXX. Thus, in this example, the switch 12a determines that the end user number is a portable number. The switch 12a then launches a query via STP 24 to a database element 54 such as an SCP.

In response to the query, the SCP 54 checks for a match between the end user number and a ported number among a list of ported numbers found in a local number portability (LNP) database 55. The LNP database is located preferably as a part of the SCP 54. Those skilled in the art will understand that the LNP database 55 may be separate from an SCP, or incorporated as part of another network element such as a service node or even a switch. The LNP database stores a location routing number (LRN) in association with each directory number that has been ported and that is served by that LNP database. The LRN, typically consisting of ten digits, of which the first six digits uniquely identify the current service provider's switch that serves the end user station associated with the ported directory number. For example, the LNP database performs a look-up in its ported number table to match the end user number with the ported numbers to find the corresponding LRN. As shown in Table 1, the end user number, 404-872-5329, is a ported number, which generates the LRN, 404-777-0000.

TABLE 1

Ported Number Table Processing

| End User No. Received From Switch | Ported No. | LRN |
| --- | --- | --- |
| 404-872-5329 | 770-555-1234 | 770-111-0000 |
|  | 770-555-2345 | 770-555-0000 |
|  | 404-872-5329 | 404-777-0000 |
|  | 404-872-1212 | 404-872-0000 |

By obtaining the LRN, 404-777-0000, the call can be properly routed based on the LRN. In this case, the call is routed to switch 12b based on the LRN, 404-777-0000. The switch 12b then directs the call to the end user station 20.

In the preferred embodiment, the LNP database 55 also preferably stores information pertaining to information delivery services that a service provider offers to its customers. A check is made of the LNP database 55 to determine whether the service provider identified by its LRN offers information delivery services such as the calling name feature. If the information indicates that the service provider identified by its LRN does not offer any information delivery services, then only the LRN is sent to the switch 12a. The call is then routed to an end office switch based on the LRN, and the call is ultimately directed to an end user station.

However, if the information stored in the LNP database 55 indicates that the service provider identified by its LRN offers information delivery services, then an information delivery service database 56 is consulted with respect to the call. The information delivery service database 56 preferably stores information associated with the information delivery service feature. The information delivery service database 56 is preferably functionally connected to the LNP database 55. Those skilled in the art will understand that the information delivery service database 56 may be incorporated as part of the LNP database 55, separate from an SCP, or incorporated as part of another network element such as a service node or even a switch. Alternatively, the information such as may be stored in the information delivery service database 56 may be stored in the LNP database 55.

Referring to the example, the LNP database 55 contains information associating an LRN with a specific service provider. For instance, in Table 2 below, the LRN 404-777-0000 corresponds to service provider Carrier C.

TABLE 2

Service Provider Identification Table

| LRN | Service Provider |
|---|---|
| 770-111-0000 | Carrier A |
| 770-555-0000 | Carrier B |
| 404-777-0000 | Carrier C |
| 404-872-0000 | Carrier D |

Once the service provider associated with a particular LRN is identified, information is sought within the LNP database 55 (as explained below) as to whether the service provider offers calling name identification, for example. If the LNP database 55 contains information that the service provider offers calling name identification, then the information delivery service database 56 associated with calling name identification is consulted with respect to the call. In Table 3 below, service provider Carrier C offers the calling name feature to its customers. Therefore, the information delivery service database 56 associated with calling name identification is consulted with respect to the communication.

TABLE 3

Calling Name Look-up Table

| Service Provider | Calling Name Look-up Flag |
|---|---|
| Carrier A | no |
| Carrier B | no |
| Carrier C | yes |
| Carrier D | no |

In this example, calling name information is retrieved from the information delivery service database 56 associated with the calling name feature. This information is sent to the LNP database 55 in the SCP 54.

In the preferred embodiment, communication between the SCP 54 and the information delivery service database 56 may be perfected preferably by way of conventional internal or external interfaces 58. It will be understood by those skilled in the art that the present invention can also be configured such that the LNP database and any information delivery service database, such as the calling name database 56, are located within the same SCP. Other acceptable configurations will also occur to those skilled in the art.

Once the LNP database 55 receives the calling name information, or other information, the LNP database 55 sends the information obtained from the information delivery service database 56 and the LRN obtained from the LNP database 55 to the switch 12a via STP 24.

In the preferred embodiment, the switch 12a then preferably populates the information in a signaling message to be sent to the switch 12b. Those skilled in the art will understand that the signaling message may be an integrated services digital network user part (ISUP) signaling message. The ISUP signaling message employs an SS7 signaling protocol. Various parameters exist within the ISUP signaling message. One parameter of an ISUP signaling message is referred to as the GenericName parameter. GenericName is an alpha-numeric field typically intended to carry alphanumeric names. The GenericName parameter is used in the present invention preferably to store information such as information obtained from an information delivery service database. Those skilled in the art will understand that additional parameters can be conceived and defined to carry other information such as an originating user's location and so forth. For more information regarding SS7 signaling protocol employed by the ISUP signaling message, see American National Standards Institute (ANSI) - T1.113 Standards on ISUP Signaling, which is incorporated herein by reference.

After the information is stored in the signaling message, the switch 12a sets up the call based on the LRN. The signaling message is then sent ultimately to the switch 12b. However, the signaling message may travel via intermediate switches 60 to the switch 12b. The switch 12b then sends the call to the end user station 20.

In essence, the preferred embodiment is configured such that a network element serving an originating user retrieves information obtained from an information delivery service database, in addition to retrieving an LRN for routing a call from an LNP database. The network element serving the originating user then transmits the information as a part of a signaling message to a network element serving an end user. For example, calling name information is retrieved from the information delivery service database associated with the calling name feature. In addition, an LRN is obtained from the LNP database. The calling name information and the LRN are then sent to a switch serving the originating user. The switch serving the originating user transmits the information as a part of a signaling message to a switch serving the end user.

Figure 3A:
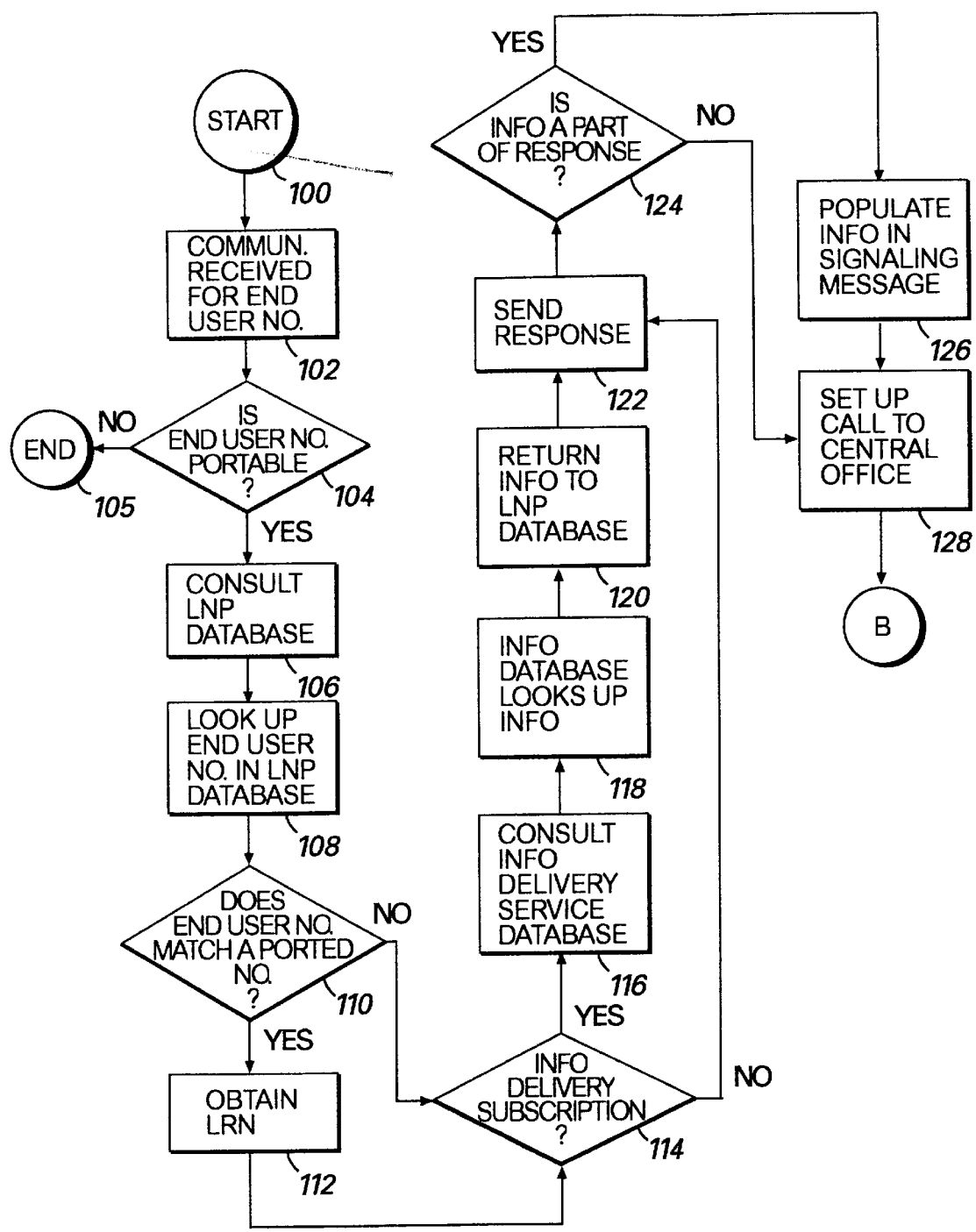
FIGS. 3A and 3B are flow diagrams illustrating the preferred steps of delivering information obtained from an information delivery service database in a local number portability environment in accordance with the preferred embodiment of the present invention.
Figure 3B:
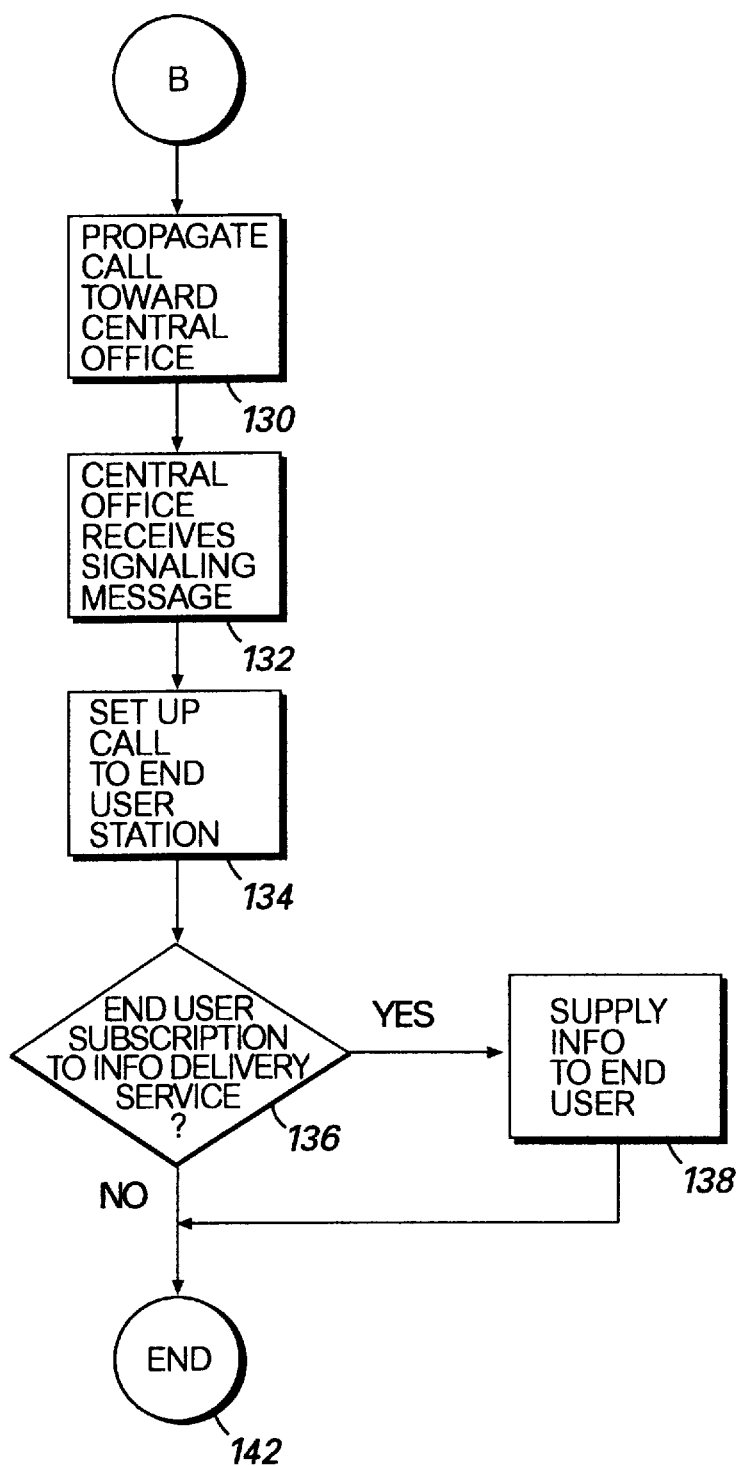

Preferred Operation for Delivery of Information in a Local Number Portability Environment With continuing reference to FIGS. 1 and 2, the flow diagrams of FIGS. 3A and 3B illustrate the preferred steps of delivering information obtained from an information delivery service database in a local number portability environment.

The preferred operation begins in START step 100, and in step 102, a communication is received for an end user number. In step 104, a determination is made as to whether the end user number is portable. If the end user number is portable, the "YES" branch is followed to step 106; otherwise, the "NO" branch is followed to the END step 105 with the call being provided conventional service. In step 106, a local number portability (LNP) database is consulted with respect to the communication. Next, the end user number is looked up in the LNP database in step 108.

In step 110, a determination is made as to whether the end user number is a ported number. If the end user number is a ported number, the "YES" branch is followed to step 112; otherwise, the "NO" branch is followed to 114. In step 112, a location routing number (LRN) is obtained corresponding to the ported number. Next, in step 114, an inquiry is made to determine whether there exists an information delivery service subscription. If so, the "YES" branch is followed to step 116; otherwise, the "NO" branch is followed to step 122.

In step 116, an information delivery service database is consulted with respect to the call. Next, information associated with a delivery service is obtained from the information delivery service database in step 118. In step 120, the information is sent to the LNP database. Once the information is retrieved by the LNP database, the LNP database sends a response in step 122.

In step 124, a determination is made as to whether the response contains information obtained from the information delivery service database along with the LRN. It should be noted that the response in step 122 may include 1) only the LRN or 2) the LRN in combination with information obtained from the information delivery service database. If the response contains both the LRN and information obtained from the information delivery service database, the "YES" branch is followed to step 126; otherwise, the "NO" branch is followed to step 128. In step 126, the information is populated in a signaling message. Next, in step 128, a call is set up to a central office. Once the call is set up, the call is propagated toward the central office in step 130. In step 132, the signaling message is received by the central office. Next, the call is set up to an end user station in step 134.

Once the call is set up to the end user station, a determination is made as to whether the end user has a subscription to an information delivery service in step 136. If the end user has a subscription to an information delivery service, the "YES" branch is followed to step 138; otherwise the "NO" branch is followed to the END step 142 with the call being provided conventional service. In step 138, information associated with the information delivery service subscription is supplied to the end user. The process terminates at the END step 142.

In summary, the present invention utilizes an information delivery service in a local number portability environment. Specifically, the present invention eliminates the need for separate database consultations for retrieving information from an information delivery service database by performing an information look-up during a routine local number portability database consultation. The information obtained from the information delivery service database can then be transmitted along with a location routing number obtained from a local number portability database in a local number portability response. Finally, the information can then be transmitted between switches serving an originating user and an end user by utilizing parameters in a signaling message.

Alternative embodiments will become apparent to those skilled in the art to which the present invention pertains without departing from its spirit and scope. Accordingly, the scope of the present invention is defined by the appended claims rather than the foregoing description.

What is claimed is:

1. In an Advanced Intelligent Network (AIN) and with respect to receiving an incoming call at an origination switch, a method for delivering, to a destination switch, information obtained from an information delivery service database with a location routing number obtained from a local number portability database, the information delivery service database and the local number portability database located remotely from the origination switch, the method comprising the steps of:
   (a) receiving, at the origination switch, the incoming call from an originating user number and directed to an end user number, the end user number having a portable NPA-NXX;
   (b) at the origination switch, provisioning a trigger with respect to the portable NPA-NXX;
   (c) in response to the trigger,
      i. sending a query to the remote local number portability database,
      ii. obtaining a location routing number corresponding to the end user number from the remote local number portability database,
      iii. consulting the remote information delivery service database, and
      iv. obtaining a name corresponding to the originating user number from the remote information delivery service database;
   (d) populating alpha-numeric fields in a signaling message with the location routing number corresponding to the end user number and the name corresponding to the originating user number; and
   (e) based on the location routing number, transmitting, from the origination switch to the destination switch, the name in the signaling message.

2. The method of claim 1, further comprising the steps of:
   in response to consulting the remote information delivery service database, obtaining the originating user number from the remote information delivery service database;
   populating the alpha-numeric fields in the signaling message with the originating user number; and
   based on the location routing number, transmitting, from the origination switch to the destination switch, the originating user number in the signaling message.

3. The method of claim 1, further comprising the steps of:
   in response to consulting the remote information delivery service database, obtaining the zip code corresponding to the originating user number from the remote information delivery service database;
   populating the alpha-numeric fields in the signaling message with the zip code; and
   based on the location routing number, transmitting, from the origination switch to the destination switch, the zip code in the signaling message.

4. The method of claim 1, further comprising the steps of:
   in response to consulting the remote information delivery service database, obtaining the social security number corresponding to the originating user number from the remote information delivery service database;
   populating the alpha-numeric fields in the signaling message with the social security number; and
   based on the location routing number, transmitting, from the origination switch to the destination switch, the social security number in the signaling message.

5. In an Advanced Intelligent Network (AIN) and with respect to an incoming call received at an origination switch, a method for delivering, to a destination switch, information obtained from an information delivery service database in a local number portability environment, the information delivery service database located remotely from the origination switch, the method comprising the steps of:
   (a) receiving, at the origination switch, the incoming call from an originating user number and directed to an end user number;
   (b) at the origination switch, determining whether the end user number is portable;
   (c) if the end user number is portable, then obtaining a location routing number corresponding to the end user number from a local number portability database located remotely from the origination switch;
   (d) determining whether the location routing number is associated with a destination switch designated to receive originating user information associated with a specific service feature;
   (e) if the location routing number is associated with the destination switch designated to receive originating user information associated with the specific service feature, then obtaining the originating user information associated with the specific service feature from the remote information delivery service database;

(f) at the origination switch, populating the originating user information associated with the specific service feature and the location routing number corresponding to the end user number in a signaling message; and (g) based on the location routing number, transmitting, from the origination switch to the destination switch designated to receive originating user information associated with the specific service feature, the signaling message including the originating user information associated with the specific service feature.

6. The method of claim 5, wherein step (e) through step (g) comprise the steps of:

if the location routing number is associated with the destination switch designated to receive originating user information associated with the specific service feature, then obtaining an originating user name from the remote information delivery service database;

at the origination switch, populating the originating user name and the location routing number corresponding to the end user number in a signaling message; and based on the location routing number, transmitting, from the origination switch to the destination switch designated to receive originating user information associated with the specific service feature, the signaling message including the originating user name.

7. The method of claim 5, wherein step (e) through step (g) comprise the steps of:

if the location routing number is associated with the destination switch designated to receive originating user information associated with the specific service feature, then obtaining an originating user name and the originating user number from the remote information delivery service database;

at the origination switch, populating the originating user name, the originating user number, and the location routing number corresponding to the end user number in a signaling message; and based on the location routing number, transmitting, from the origination switch to the destination switch designated to receive originating user information associated with the specific service feature, the signaling message including the originating user name and the originating user number.

8. The method of claim 5, wherein steps (e) through step (g) comprise the steps of:

if the location routing number is associated with the destination switch designated to receive originating user information associated with the specific service feature, then obtaining an originating user zip code from the remote information delivery service database;

at the origination switch, populating the originating user zip code and the location routing number corresponding to the end user number in a signaling message; and based on the location routing number, transmitting, from the origination switch to the destination switch designated to receive originating user information associated with the specific service feature, the signaling message including the originating user zip code.

9. The method of claim 5, wherein steps (e) through step (g) comprise the steps of:

if the location routing number is associated with the destination switch designated to receive originating user information associated with the specific service feature, then obtaining an originating user name and an originating user social security number from the remote information delivery service database;

at the origination switch, populating the originating user name, the originating user social security number, and the location routing number corresponding to the end user number in a signaling message; and based on the location routing number, transmitting, from the origination switch to the destination switch designated to receive originating user information associated with the specific service feature, the signaling message including the originating user name and the originating user social security number.

10. In an Advanced Intelligent Network (AIN) and with respect to an incoming call received at a first switch, a system for delivering, to a second switch, information obtained from an information delivery service database in a local number portability environment, the information delivery service database located remotely from the first switch, comprising:

a first switch operative to receive the incoming call from an originating user number and directed to an end user number and operative to determine whether the end user number is portable;

a local number portability database remotely connected to the first switch, the local number portability database being operative to compare the end user number to a plurality of ported numbers for a match to one of the plurality of ported numbers, and if the end user number matches the one of the plurality of ported numbers, then the local number portability database being further operative to obtain a location routing number identifying a second switch and corresponding to the one of the ported numbers;

an information delivery service database located remotely from the first switch and functionally connected through an interface between the local number portability database and the information delivery service database;

the local number portability database being further operative to obtain a name corresponding to the originating user number from the information delivery service database;

the local number portability database being further operative to provide the location routing number identifying the second switch and the name corresponding to the originating user number to the first switch; and the first switch being further operative to populate the location routing number identifying the second switch and the name corresponding to the originating user number in a signaling message, and based on the location routing number identifying the second switch, to transmit the name corresponding to the originating user number in the signaling message to the second switch for completing the incoming call.

11. The system of claim 10, further comprising the second switch being operative to transmit the name corresponding to the originating user number to an end user station associated with the end user number.

12. The system of claim 10, further comprising:

(a) the local number portability database being further operative to:
i. obtain a social security number corresponding to the originating user number from the information delivery service database, and
ii. provide the social security number corresponding to the originating user number to the first switch; and (b) the first switch being further operative to:
i. populate the social security number corresponding to the originating user number in the signaling message, and
ii. based on the location routing number identifying the second switch, transmit the social security number corresponding to the originating user number in the signaling message to the second switch.

13. The system of claim 10, further comprising:
   (a) the local number portability database being further operative to:
      i. obtain the originating user number from the information delivery service database, and
      ii. provide the originating user number to the first switch; and
   (b) the first switch being further operative to:
      i. populate the originating user number in the signaling message, and
      ii. based on the location routing number identifying the second switch, transmit the originating user number in the signaling message to the second switch.

14. The system of claim 10, further comprising:
   (a) the local number portability database being further operative to:
      i. obtain a zip code corresponding to the originating user number from the information delivery service database, and
      ii. provide the zip code corresponding to the originating user number to the first switch; and
   (b) the first switch being further operative to:
      i. populate the zip code corresponding to the originating user number in the signaling message, and
      ii. based on the location routing number identifying the second switch, transmit the zip code corresponding to the originating user number in the signaling message to the second switch.

15. In an Advanced Intelligent Network (AIN) and with respect to receiving an incoming call at an origination switch, a method for delivering, to a destination switch, information pertaining to a service feature obtained from an information delivery service database with a location routing number obtained from a local number portability database, the information delivery service database and the local number portability database located remotely from the origination switch, comprising the steps of:
   (a) receiving, at the origination switch, the incoming call from an originating user number and directed to an end user number, the end user number having a portable NPA-NXX;
   (b) at the origination switch, provisioning a trigger with respect to the portable NPA-NXX;
   (c) in response to the trigger,
      i. sending a query to the remote local number portability database,
      ii. obtaining a location routing number corresponding to the end user number from the remote local number portability database,
      iii. determining whether the service feature is associated with the location routing number, and
      iv. if the service feature is associated with the location routing number, then consulting the remote information delivery service database, and obtaining originating user information pertaining to the service feature from the remote information delivery service database;
   (d) at the origination switch, populating alpha-numeric fields located in a signaling message with the location routing number and the originating user information pertaining to the service feature; and
   (e) based on the location routing number, transmitting, from the origination switch to the destination switch, the signaling message including the originating user information pertaining to the service feature.

16. The method of claim 15, wherein steps (c) iv through step (e) comprise the steps of:
   if the service feature is associated with the location routing number associated with the specific service feature, then consulting the remote information delivery service database, and obtaining an originating user name from the remote information delivery service database;
   at the origination switch, populating alpha-numeric fields located in the signaling message with the location routing number and the originating user name; and
   based on the location routing number, transmitting, from the origination switch to the destination switch, the signaling message including the originating user name.

17. The method of claim 15, wherein steps (c) iv through step (e) comprise the steps of:
   if the service feature is associated with the location routing number associated with the specific service feature, then consulting the remote information delivery service database, and obtaining an originating user name and the originating user number from the remote information delivery service database;
   at the origination switch, populating alpha-numeric fields located in the signaling message with the location routing number, the originating user name, and the originating user number; and
   based on the location routing number, transmitting, from the origination switch to the destination switch, the signaling message including the originating user name and the originating user number.

18. The method of claim 15, wherein steps (c) iv through step (e) comprise the steps of:
   if the service feature is associated with the location routing number associated with the specific service feature, then consulting the remote information delivery service database, and obtaining a zip code corresponding to the originating user number from the remote information delivery service database;
   at the origination switch, populating alpha-numeric fields located in the signaling message with the location routing number and the zip code corresponding to the originating user number; and
   based on the location routing number, transmitting, from the origination switch to the destination switch, the signaling message including the zip code corresponding to the originating user number.

19. The method of claim 15, wherein steps (c) iv through step (e) comprise the steps of:
   if the service feature is associated with the location routing number associated with the specific service feature, then consulting the remote information delivery service database, and obtaining a social security number corresponding to the originating user number from the remote information delivery service database;
   at the origination switch, populating alpha-numeric fields located in the signaling message with the location routing number and the social security number corresponding to the originating user number; and
   based on the location routing number, transmitting, from the origination switch to the destination switch, the signaling message including the social security number corresponding to the originating user number.

* * * * *